(12) United States Patent
Matsuyama et al.

(10) Patent No.: US 7,350,978 B2
(45) Date of Patent: Apr. 1, 2008

(54) TAPER ROLLER BEARING

(75) Inventors: Hiroki Matsuyama, Nara (JP);
Hiroyuki Chiba, Kashiwara (JP);
Masahiro Harada, Kashiwara (JP);
Kazutoshi Toda, Tondabayashi (JP);
Kiyoshi Ogino, Kashihara (JP); Koji Kawaguchi, Izumi (JP); Yuzuru Takahashi, Kashiwara (JP); Hirofumi Dodoro, Kashihara (JP)

(73) Assignee: JTEKT Corporation, Osaka (JP)

( * ) Notice: Subject to any disclaimer, the term of this patent is extended or adjusted under 35 U.S.C. 154(b) by 0 days.

(21) Appl. No.: 11/078,378

(22) Filed: Mar. 14, 2005

(65) Prior Publication Data

US 2005/0201650 A1    Sep. 15, 2005

(30) Foreign Application Priority Data

Mar. 15, 2004 (JP) ............................ P2004-072919

(51) Int. Cl.
*F16C 33/46* (2006.01)

(52) U.S. Cl. ................. 384/571; 384/572; 384/575

(58) Field of Classification Search ............. 384/470, 384/571–580
See application file for complete search history.

(56) References Cited

U.S. PATENT DOCUMENTS 1,477,164 A    12/1923    Close
2,015,229 A *  9/1935    Lothrop et al. ............. 384/575
2,071,628 A *  2/1937    Hedgcock .................... 384/571
3,578,831 A *  5/1971    Scheifele .................... 384/571
3,951,483 A *  4/1976    Nakamura ................... 384/565
5,009,525 A    4/1991    Brockmüller et al.
6,022,148 A *  2/2000    Back et al. .................. 384/576

FOREIGN PATENT DOCUMENTS

| FR | 765.769    | 6/1934  |
|----|------------|---------|
| JP | 11-325087  | 11/1999 |
| JP | 2001-140900| 5/2001  |
| JP | 2002-039187| 2/2002  |

OTHER PUBLICATIONS

European Search Report dated May 24, 2005.

* cited by examiner

*Primary Examiner*—Thomas R. Hannon
(74) *Attorney, Agent, or Firm*—McGinn IP Law Group, PLLC

(57) ABSTRACT

An end faced on an outer side in a radial direction of a small diameter annular portion of a retainer is disposed on an inner side in a radial direction of a pitch conical face of a taper roller and an end face on an inner side in a radial direction of a large diameter annular portion is disposed on an outer side in the radial direction of the pitch conical face. Further, a portion of the small diameter annular portion opposed to a small diameter end face of the taper roller is disposed on the inner side in the radial direction of the pitch conical face and a portion of the large diameter annular portion opposed to a large diameter end face of the taper roller is disposed on the outer side in the radial direction of the pitch conical face.

11 Claims, 2 Drawing Sheets

TAPER ROLLER BEARING

BACKGROUND OF THE INVENTION

The present invention relates to a taper roller bearing.

In a background art, there is a taper roller bearing described in JP-A-2001-140900.

The taper roller bearing is provided with an outer ring, an inner ring, and a taper roller, an inner peripheral face of the outer ring is formed with a raceway surface in a conical shape, and a portion of an outer peripheral face of the inner ring opposed to the raceway surface of the outer ring is formed with a raceway surface in a conical shape.

A plurality of the taper rollers are arranged to be spaced apart from each other at constant intervals in a peripheral direction in a state of being retained by a retainer between the raceway surface of the outer ring and the raceway surface of the inner ring.

According to the retainer, an interval between a small diameter annular portion and a large diameter annular portion thereof are connected by a plurality of column portions, and both of an end face of the small diameter annular portion on an inner side in a radial direction and an end face of the large diameter annular portion on an inner side in a radial direction are disposed on an outer side in a radial direction of a pitch conical face of the taper roller.

However, according to the above-described taper roller bearing of the background art, since both of the end face of the small diameter annular portion on the inner side in the radial direction and the end face of the large diameter annular portion on the inner side in the radial direction are disposed on the outer side in the radial direction of the pitch conical face, there poses a problem that a lubricant supplied to a small diameter end side of the taper roller bearing and on an inner side of the retainer is not smoothly discharged, an agitation resistance is increased and a rotational torque is increased.

SUMMARY OF THE INVENTION

Hence, it is an object of the invention to provide a taper roller bearing capable of reducing a rotational torque.

In order to resolve the above-described problem, a taper roller bearing of the invention is characterized in comprising:

an outer ring having a raceway surface at an inner periphery thereof;

an inner ring having a raceway surface at an outer periphery thereof;

a retainer arranged between the outer ring and the inner ring and formed with pockets by connecting a small diameter annular portion and a large diameter annular portion thereof by a plurality of column portions; and a taper roller arranged between the raceway surface of the outer ring and the raceway surface of the inner ring and contained in the pocket;

wherein an end face on an outer side in a radial direction of the small diameter annular portion of the retainer is disposed on an inner side in a radial direction of a pitch conical face of the taper roller and an end face on an inner side in a radial direction of the large diameter annular portion is disposed on an outer side in the radial direction of the pitch conical face of the taper roller.

According to an experiment showing a relationship among a position of an end portion in an axial direction of a small diameter annular portion of a retainer and a position of an end portion in an axial direction of a large diameter annular portion of the retainer and a rotational torque of a taper roller bearing, it is found that when an end face on an outer side in a radial direction of the small diameter annular portion is disposed on an inner side in a radial direction of a pitch conical face of the taper roller and an end face on an inner side in a radial direction of a large diameter annular portion is disposed on an outer side in the radial direction of the pitch conical face of the taper roller, a rotational torque thereof can considerably be reduced in comparison with that in a case of disposing an end face on an inner side in a radial direction of a small diameter annular portion and an end face on an inner side in a radial direction of a large diameter annular portion of the background art on an outer side in a radial direction of a pitch conical face of the taper roller.

According to the invention, the end face on the outer side in the radial direction of the small diameter annular portion of the retainer is disposed on the inner side in the radial direction of the pitch conical face of the taper roller, the end face on the inner side in the radial direction of the large diameter annular portion is disposed on the outer side in the radial direction of the pitch conical face of the taper roller and therefore, the rotational torque can considerably be reduced.

The rotational torque is reduced since by disposing the end face on the outer side in the radial direction of the small diameter annular portion on the inner side in the radial direction of the pitch conical face of the taper roller, an amount of a lubricant advancing into the bearing from between the inner ring and the retainer can be reduced, further, by disposing the end face on the inner side in the radial direction of the large diameter annular portion on the outer side in the radial direction of the pitch conical face of the taper roller, the lubricant advancing into the bearing from between the inner ring and the retainer can be facilitated to flow out to outside of the bearing and therefore, an amount of the lubricant between the inner ring and the retainer which is liable to stay in the bearing to increase an agitation resistance can be reduced. Meanwhile, it is predicted that the lubricant between the retainer and the outer ring is exerted with a large centrifugal force and therefore, the lubricant is liable to flow out to outside of the bearing and an amount of the lubricant between the retainer and the outer ring does not constitute a factor for increasing agitation resistance. Further, it is difficult to supply a large amount of the lubricant unnecessarily to between the inner ring and the outer ring of the bearing and therefore, also a rolling resistance (rolling viscous resistance) brought about between a roller rolling face (surface) and the raceway surface can also be reduced.

Further, a taper roller bearing of the invention is characterized in comprising:

an outer ring having a raceway surface on an inner periphery thereof;

an inner ring having a raceway surface on an outer periphery thereof;

a retainer arranged between the outer ring and the inner ring and formed with pockets by connecting a small diameter annular portion and a large diameter annular portion thereof by a plurality of column portions; and a taper roller arranged between the raceway surface of the inner ring and the raceway surface of the inner ring and contained in the pocket;

wherein a portion of the small diameter annular portion of the retainer opposed to a small diameter end face of the taper roller is disposed on an inner side in a radial direction of a pitch conical face of the taper roller and a portion of the large diameter annular portion opposed to a large diameter end face of the taper roller is disposed on an outer side in the radial direction of the pitch conical face of the taper roller.

According to the invention, the portion of the small diameter annular portion opposed to the small diameter end face of the taper roller is disposed on the inner side in the radial direction of the pitch conical face of the taper roller, the portion of the large diameter annular portion opposed to the large diameter end face of the taper roller is disposed on the outer side in the radial direction of the pitch conical face of the taper roller and therefore, an opening between a position of an end face on the inner side in the radial direction of the small diameter annular portion and the inner ring can be reduced and an opening between the inner ring and a position of an end face on the inner side in the radial direction of the large diameter annular portion can further be increased. Further, an inclination in an axial direction of the column portion can be increased and therefore, a pump effect of making the lubricant between the inner ring and the retainer flow out to a side of the large diameter annular portion can be increased.

Further, according to the taper roller bearing of an embodiment, in a sectional view in axial direction including the column portion, the small diameter annular portion, the column portion and the large diameter annular portion are extended substantially in a linear shape.

According to the invention, the small diameter annular portion, the column portion and the large diameter annular portion are extended substantially in the linear shape and therefore, a flow of the lubricant from the small diameter annular portion to the large diameter annular portion can be rectified, a turbulent flow of vortex or the like can be prevented and the flow of the lubricant can be made to be smooth Therefore, the agitation resistance can further be reduced.

According to the taper roller bearing of the invention, the end face on the outer side in the radial direction of the small diameter annular portion is disposed on the inner side in the radial direction of the pitch conical face of the taper roller, the end face on the inner side in the radial direction of the large diameter annular portion is disposed on the outer side in the radial direction of the pitch conical face of the taper roller and therefore, the rotational torque can considerably made to be smaller than that of the background art.

Further, according to the taper roller bearing of the invention, the portion of the small diameter annular portion opposed to the small diameter end face of the taper roller is disposed on the inner side in the radial direction of the pitch conical face of the taper roller, the portion of the large diameter annular portion opposed to the large diameter end face of the taper roller is disposed on the outer side in the radial direction of the pitch conical face of the taper roller and therefore, an opening between a position of an end face on the inner side in the radial direction of the small diameter annular portion and the inner ring can further be reduced and an opening between the inner ring and a position of an end face on the inner side in the radial direction of the large diameter annular portion can further be increased. Further, an inclination in an axial direction of the column portion can be increased and therefore, a pump effect of making the lubricant between the inner ring of the retainer flow out to a side of the large diameter annular portion can be increased.

DETAILED DESCRIPTION OF THE PREFERRED EMBODIMENTS

The invention will be explained in details by an illustrated mode as follows.

Figure 1:
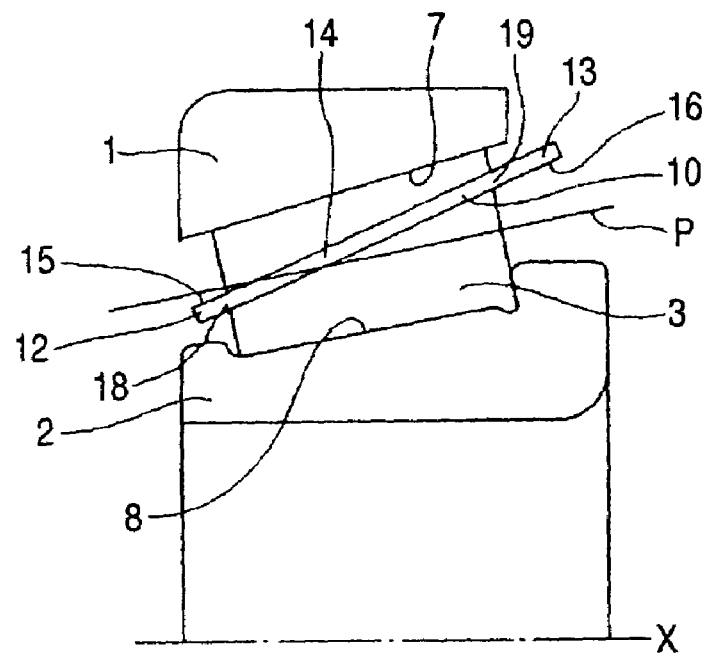
FIG. 1 is a sectional view in an axial direction of a taper roller bearing according to an embodiment of the invention.

FIG. 1 is a sectional view in an axial direction of a taper roller bearing according to an embodiment of the invention.

The taper roller bearing is provided with an outer ring 1, an inner ring 2 and a taper roller 3.

A plurality of the taper rollers 3 are arranged to be spaced apart from each other at constant intervals in a peripheral direction in a state of being retained by a retainer 10 between a raceway surface 7 of the outer ring 1 and a raceway surface 8 of the inner ring 2.

Figure 2:
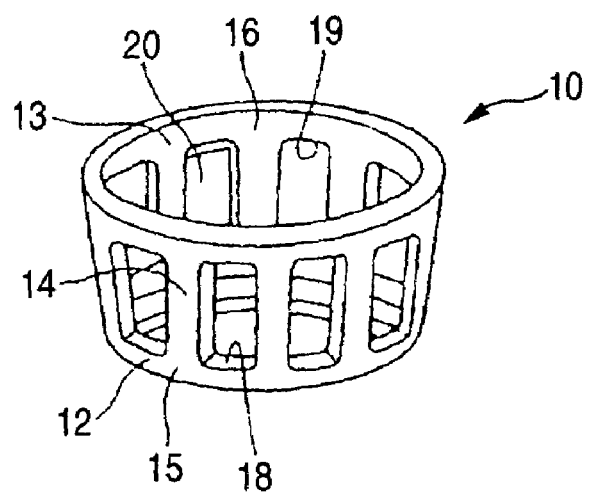
FIG. 2 is a perspective view of a retainer provided to the taper roller bearing of the embodiment.

As shown by FIG. 2 which is a perspective view of the retainer 10, the retainer 10 comprises a small diameter annular portion 12, a large diameter annular portion 13 having a diameter larger than that of the small diameter annular portion 12, and eight column portions 14 for connecting the small diameter annular portion 12 and the large diameter annular portion 13 at eight portions at equal intervals in a peripheral direction. A pocket 20 for containing the taper roller 3 is formed between the contiguous two column portions 14.

As shown by FIG. 1, an end face (peripheral face) 15 on an outer side in a radial direction of the small diameter annular portion 12 designated by numeral 15 in FIG. 1 and FIG. 2 is disposed on an inner side in a radial direction of a pitch conical face P of the taper roller 3, and an end face (peripheral face) on an inner side in a radial direction of the large diameter annular portion 13 designated by numeral 16 in FIG. 1 and FIG. 2 is disposed on an outer side in the radial direction of the pitch conical face P of the taper roller 3. The pitch conical face P is defined by a conical surface which a rotation axis of the taper roller draws when the taper roller 3 rolls over the inner ring 2 about a rotation axis X of the bearing.

Further, a portion of the small diameter annular portion 12 designated by numeral 18 in FIG. 1 and FIG. 2 opposed to a small diameter end face of the taper roller 3 is disposed on the inner side in the radial direction of the pitch conical face P of the taper roller 3, and a portion of the large diameter annular portion 13 designated by numeral 19 in FIG. 1 and FIG. 2 opposed to a large diameter end face of the taper roller 3 is disposed on the outer side in the radial direction of the pitch conical face P of the taper roller 3. Further, the column portion 14 is disposed on the outer side in the radial direction of the pitch conical face P at a center portion in an axial direction of the taper roller 3.

Further, as shown by FIG. 1, the small diameter annular portion 12, the column portion 14 and the large diameter annular portion 13 are extended substantially in a linear shape.

Figure 3:
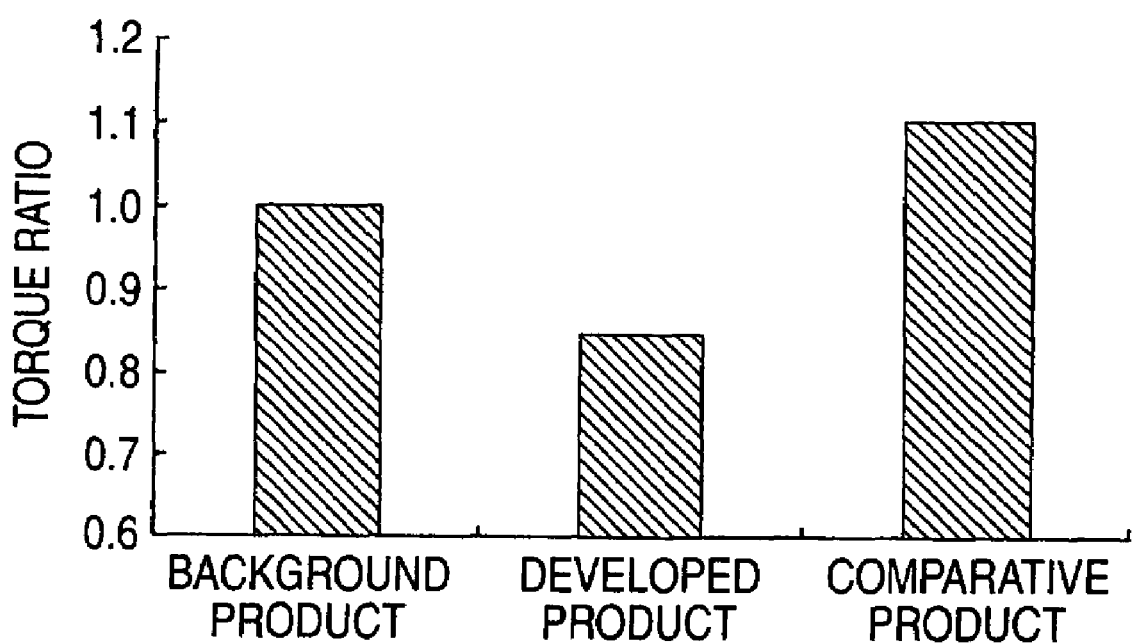
FIG. 3 is a diagram showing a relationship between a shape of the retainer and a torque of the taper roller bearing.

FIG. 3 is a diagram showing a relationship among a position of an end portion in an axial direction of the small diameter annular portion of the retainer and a position of an end portion in an axial direction of the large diameter annular portion of the retainer and a rotational torque of a taper roller bearing.

In FIG. 3, a developed product is the taper roller bearing according to the above-described embodiment.

Further, a background art product is a taper roller bearing using a retainer in which a small diameter annular portion, a column portion and a large diameter annular portion of the retainer are extended substantially in a linear shape, further, both of an end face on an inner side in a radial direction of the small diameter annular portion and an end face on an inner side in a radial direction of the large diameter annular portion are disposed on an outer side in a radial direction of a pitch conical face of a taper roller.

Further, a comparative product is a taper roller bearing using a retainer in which a small diameter annular portion, a column portion and a large diameter annular portion of the retainer are extended substantially in a linear shape, further, an end face on an inner side in a radial direction of the small diameter annular portion is disposed on an outer side in a radial direction of a pitch conical face of a taper roller and an end face on an outer side in a radial direction of the large diameter annular portion is disposed on an inner side in the radial direction of the pitch conical face of the taper roller.

Further, data of FIG. 3 is experimental data when an inner diameter and an outer diameter and a set width of a bearing are inner diameter ϕ30 mm×outer diameter ϕ72 mm×set width 20.75 mm, an axial load is 4 kN, a rotational speed of an inner ring which is a rotating ring is 2000 r/min, a lubricant is a gear oil of 85W-90 by SAE viscosity classification rectified by Society of Automotive Engineers, a temperature of the lubricant is about 50° C. and an oil feed amount is 6 L/min.

As shown by FIG. 3, when a torque of a taper roller bearing of the background art product is set to 1, a torque of the taper roller bearing of the invention is 0.85 and a torque of a taper roller bearing of the comparative product is 1.1.

That is, as an inclination of a column portion of a retainer in a sectional view in an axial direction is changed to be negative, null, positive from a side of a small diameter end face to a side of a large diameter end face of a taper roller, the torque of the taper roller bearing is rapidly reduced.

Therefrom, when the small diameter annular portion 12, the large diameter annular portion 13 and the column portion 14 are positioned as in the above-described embodiment, the rotational torque can rapidly be reduced.

According to the taper roller bearing of the embodiment, the end face (peripheral face) 15 on the outer side in the radial direction of the small diameter annular portion 12 is disposed on the inner side in the radial direction of the pitch conical face P, the end face on the inner side in the radial direction of the large diameter annular portion 13 is disposed on the outer side in the radial direction of the pitch conical face P and therefore, the rotational torque can considerably be reduced to a value of about 85% of the rotational torque of the taper roller bearing of the background art in which both of the end face on the inner side in the radial direction of the small diameter annular portion and the end face on the inner side in the radial direction of the large diameter annular portion are disposed on the outer side in the radial direction of the pitch conical face of the taper roller. Therefore, when the taper roller bearing is used in an automobile or the like, a fuel consumption rate can be reduced, and an environmental load can be reduced. Particularly, the taper roller bearing is effective when used for supporting rotation of a differential pinion gear for automobile such as of a final speed reducing gear a differential gear, a transaxle device or the like lubricated by supplying a large amount of a lubricant (lubricant oil).

Further, according to the taper roller bearing of the above-described embodiment, the portion 18 of the small diameter annular portion 12 opposed to the small diameter end face of the taper roller 3 is disposed on the inner side in the radial direction of the pitch conical face P, the portion 19 of the large diameter annular portion 13 opposed to the large diameter end face of the taper roller 3 is disposed on the outer side in the radial direction of the pitch conical face P and therefore, an opening between a position of an end face on the inner side in the radial direction of the small diameter annular portion 12 and the inner ring can further be reduced and an opening between the inner ring 2 and a position of an end face on the inner side in the radial direction of the large diameter annular portion 13 can further be increased. Further, an inclination in an axial direction of the column portion 14 can be increased and therefore, a pump effect of making the lubricant between the inner ring 2 and the retainer 10 flow out to a side of the large diameter annular portion 13 can be increased.

Further, according to the taper roller bearing of the above-described embodiment, the small diameter annular portion 12, the column portion 14 and the large diameter annular portion 13 are extended substantially in the linear shape in a sectional view in the axial direction and therefore, a flow of the lubricant from the small diameter annular portion 12 to the large diameter annular portion 13 can be rectified, and the flow of the lubricant can be made to be smooth without producing a turbulent flow of vortex or the like. Therefore, the agitation resistance can further be reduced.

Further, although according to the taper roller bearing of the embodiment, the column portion 14 substantially in the linear shape is adopted, according to the invention, a smoothly bent column portion may be adopted. A column portion in a shape of a polygonal line folded to bend at a portion or several portions in the axial direction may also be adopted.

Further, although according to the taper roller bearing of the embodiment, the small diameter annular portion 12 and the large diameter annular portion 13 are connected by eight pieces of the column portions 14, according to the taper roller bearing of the invention, the small diameter annular portion and the large diameter annular portion may be connected by a plurality of pieces of the column portions other than eight pieces thereof.

Further, although according to the taper roller bearing of the embodiment, the column portion 14 is disposed on the outer side in the radial direction of the pitch conical face P at the center portion in the axial direction of the taper roller 3, according to the taper roller bearing of the invention, the column portion may be disposed on the pitch conical face at the center portion in the axial direction of the taper roller and substantially on the pitch conical face.

Further, although according to the taper roller bearing of the embodiment, the small diameter annular portion 12, the column portion 14 and the large diameter annular portion 13 are extended substantially in the linear shape in the sectional view in the axial direction, according to the taper roller bearing of the invention, a total of the small diameter annular portion may not be present on an extended linear line of the column portion substantially in the linear shape but the small diameter annular portion may include a curl portion extended substantially to the inner side in the radial direction.

What is claimed is:

1. A taper roller bearing comprising:
    an outer ring that has a raceway surface at an inner periphery thereof;
    an inner ring that has a raceway surface at an outer periphery thereof;

a retainer that is arranged between the outer ring and the inner ring, includes a smaller diameter annular portion and a large diameter annular portion and is formed with pockets by connecting the small diameter annular portion and the large diameter annular portion by a plurality of column portions having a linear shape; and taper rollers that are arranged between the raceway surface of the outer ring and the raceway surface of the inner ring and contained in the pockets, wherein an end face on an outer side in a radial direction of the small diameter annular portion of the retainer is disposed on an inner side in the radial direction of a pitch conical face of the taper roller and an end face on an inner side in the radial direction of the large diameter annular portion is disposed on an outer side in the radial direction of the pitch conical face of the taper roller.

2. The taper roller bearing according to claim 1, wherein a portion of the small diameter annular portion of the retainer opposed to a small diameter end face of the taper roller is disposed on an inner side in a radial direction of the pitch conical face of the taper roller, and a portion of the large diameter annular portion opposed to a large diameter end face of the taper roller is disposed on an outer side in the radial direction of the pitch conical face of the taper roller.

3. The taper roller bearing according to claim 1, wherein in a sectional view in an axial direction including the column portion, the small diameter annular portion, the column portion and the large diameter annular portion are extended substantially in a linear shape.

4. The taper roller bearing according to claim 1, wherein an opening between a position of the end face on the inner side in the radial direction of the small diameter annular portion and the inner ring is smaller than and an opening between the inner ring and a position of the end face on the inner side in the radial direction of the large diameter annular portion.

5. The taper roller bearing according to claim 1, wherein the pitch conical face of the taper roller comprises a conical surface which a rotation axis of the taper roller draws when the taper roller rolls over the inner ring about a rotation axis of the taper roller bearing.

6. The taper roller bearing according to claim 1, wherein the column portions are disposed on the outer side in the radial direction of the pitch conical face at a center portion in an axial direction of the taper rollers.

7. The taper roller bearing according to claim 1, wherein the column portions are disposed on the pitch conical face at a center portion in an axial direction of the taper rollers and substantially on the pitch conical face.

8. The taper roller bearing according to claim 1, wherein the column portion is disposed on the pitch conical face at a center portion in the axial direction of the taper roller.

9. The taper roller bearing according to claim 1, further comprising:

a radially outer end surface of a small diameter side of the column portions is located on a radially inner side of the pitch conical face; and a radially inner end surface of a larger diameter side of the column portions is located on a radially outer side of the pitch conical face.

10. A taper roller bearing comprising:

an outer ring that has a raceway surface at an inner periphery thereof;

an inner ring that has a raceway surface at an outer periphery thereof;

a retainer that is arranged between the outer ring and the inner ring, includes a smaller diameter annular portion and a large diameter annular portion and is formed with pockets by connecting the small diameter annular portion and the large diameter annular portion by a plurality of column portions having a linear shape; and taper rollers that are arranged between the raceway surface of the outer ring and the raceway surface of the inner ring and contained in the pockets, wherein a portion of the small diameter annular portion of the retainer opposed to a small diameter end face of the taper roller is disposed on an inner side in a radial direction of a pitch conical face of the taper roller and a portion of the large diameter annular portion opposed to a large diameter end face of the taper roller is disposed on an outer side in the radial direction of the pitch conical face of the taper roller, wherein a radially outer end surface of a small diameter side of the column portions is located on a radially inner side of the pitch conical face, and wherein a radially inner end surface of a larger diameter side of the column portions is located on a radially outer side of the pitch conical face.

11. A taper roller bearing comprising:

an outer ring;

an inner ring;

a retainer arranged between the outer ring and the inner ring, includes a smaller diameter annular portion and a large diameter annular portion and is formed with pockets by connecting the small diameter annular portion and the large diameter annular portion by a plurality of column portions having a linear shape;

a taper roller arranged between the outer ring and the inner ring; and means for facilitating an advance of lubricant between the inner ring and the retainer, comprising an end face on an inner side in a radial direction of the large diameter annular portion, wherein the end face is disposed on an outer side in the radial direction of a pitch conical face of the taper roller, wherein a radially outer end surface of a small diameter side of the column portions is located on a radially inner side of the pitch conical face, and wherein a radially inner end surface of a larger diameter side of the column portions is located on a radially outer side of the pitch conical face.

* * * * *